Aug. 23, 1966 A. P. JACKEL 3,268,662

COORDINATION ARRANGEMENT FOR TELEPHONE AND REMOTE CONTROL COMMUNICATION OVER A COMMON CHANNEL

Filed May 24, 1962 3 Sheets-Sheet 1

Aug. 23, 1966 A. P. JACKEL 3,268,662

COORDINATION ARRANGEMENT FOR TELEPHONE AND REMOTE CONTROL COMMUNICATION OVER A COMMON CHANNEL

Filed May 24, 1962 3 Sheets-Sheet 3

3,268,662
Patented August 23, 1966

3,268,662

COORDINATION ARRANGEMENT FOR TELEPHONE AND REMOTE CONTROL COMMUNICATION OVER A COMMON CHANNEL

Arthur P. Jackel, Penn Hills Township, Allegheny County, Pa., assignor to Westinghouse Air Brake Company, Wilmerding, Pa., a corporation of Pennsylvania Filed May 24, 1962, Ser. No. 197,320
7 Claims. (Cl. 179—2)

Figure 1A:
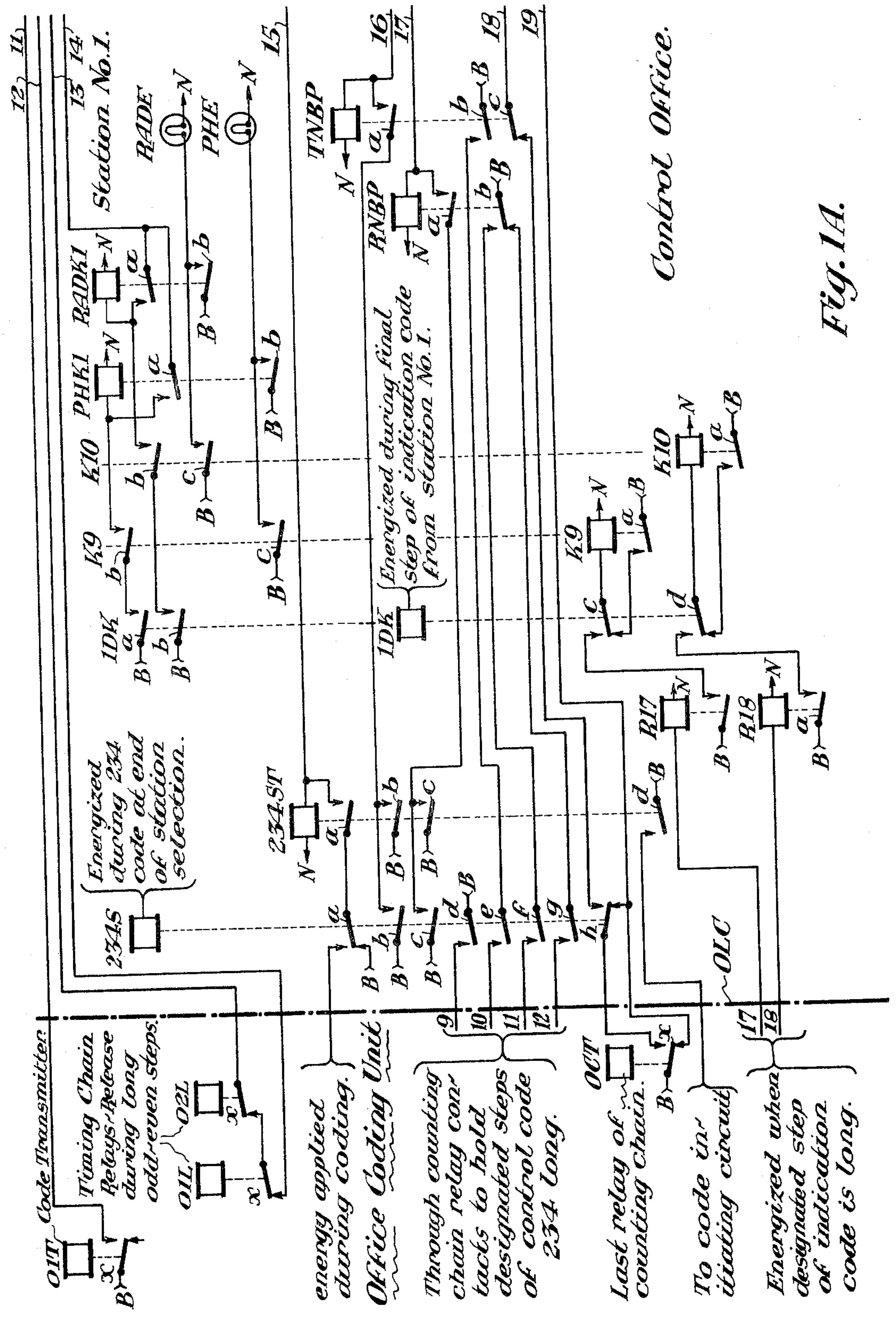

This invention relates to a coordination circuit arrangement for telephone and remote control system communications over a common communication channel. More specifically, this invention pertains to coordinating the use of a single communication circuit for normally transmitting coded voice frequency tones of a remote control system and for at times changing over to the transmission of telephone conversations which are also in the voice frequency range.

The use of remote control systems for the control of various types of transport media is common practice in industry today. In the transmission of the control and indication functions between locations of such remote control systems, the communication channel is sometimes a leased commercial circuit. This is particularly true when the transport system being controlled is a gas or oil pipe line since such organizations generally do not have self-owned communication systems. Many times the leased communication channel is of the voice frequency type and was formerly used for telephone communication between the remote stations of the system and the control office. It is usually desirable, if for no other reason than the cost advantage, to be able to retain such a communication circuit for use by the remote control system. Such leased circuits are not usable for direct current code pulses such as are used by a commonly used, well known type of remote control system. In other words, the leased circuit is of a type which requires that any current transmitted thereover be in the voice frequency range. Obviously, this forces the use of voice frequency tone circuits for the remote control system, such tone circuits being coded in the one well known type of system. In this well known system, it is the time length of the code pulses which carries the intelligence and not the actual frequency, the voice frequency being merely a means for using the available communication channel. However, the use of such voice frequency tones creates a problem when joint use of the channel with the former telephone network is planned, that is, when the existing telephone circuits to the various remote stations are still in use. Since the communication channel is of the voice frequency type so that the telephone conversation is transmitted in the voice frequency range, these telephone transmissions will interfere with the remote control system codes. Furthermore, the voice frequency code pulses are more noticeable in a telephone circuit than are direct current code pulses and are generally unacceptable since they make the telephone conversation difficult.

Accordingly, an object of my invention is a circuit arrangement for coordinating the joint use of a single communication channel by a private telephone network and a voice frequency remote control system.

It is another object of my invention to provide coordination to avoid interference between a telephone network and a remote control system which use a common communication channel over which to transmit similar type currents.

Still another object of my invention is to coordinate between a remote control system and a telephone network which transmit over a single channel on a common user basis.

Still another object of my invention is a circuit arrangement to coordinate the common use of a single communication channel by a remote control system and a telephone circuit whose transmitted signals have common characteristics.

It is also an object of my invention to provide a circuit arrangement by which a normally active coded remote control system using voice frequency currents shares a single communication circuit with a regular voice telephone system without cross interference between the two systems.

A further object of my invention is to provide control means by which a normally active coded remote control system using voice frequency tones for function transmission is made temporarily inactive, that is, locked out, so that a voice frequency telephone network with remote radio links may use a single available communication channel.

Still another object of my invention is a coordination control means which locks out the normally active control and indication voice frequency tone circuits of a coded remote control system to permit the temporary use of a single communication channel by a telephone network, but which retains for the remote control system the capability of indicating the presence of a station alarm condition at any time during telephone conversation.

Other objects, features, and advantages of my invention will become apparent from the following description when taken in connection with the accompanying drawings.

Described in general terms, the system of my invention includes a basic remote control system, illustrated as being of the time code type, which transmits pulses of voice frequency tones over what is effectively a single communication channel extending between the control office and all of the remotely controlled stations. As shown herein, a single tone is used for the transmission of control functions to all stations assigned to a single office control unit. However, each station transmits its indication functions using a different voice frequency tone, each tone being distinct in the complete control system. Each of the tone circuits requires a transmitter and a receiver to, respectively, generate and receive these assigned frequencies. The control office and each station is supplied with a telephone as part of a network providing direct conversation between the system operator and company personnel at any of the station locations. The telephone network relies on voice frequency currents to transmit the conversations over the single communication channel which must be used in common with the remote control system. Some of the remote stations, specifically the example shown in the present application, have radio apparatus for voice retransmission to remote personnel located at other than one of the controlled stations. Obviously, simultaneous transmission by the remote control system and the telephone network will cause interference. Especially the telephone transmissions interfere with the remote control system codes and may cause the reception of an incorrect function at the selected receiving location resulting in operations or indications which are incorrect and highly undesirable. In general, to overcome this interference, the telephone apparatus and network, that is, the units at each location, are held in an inactive state until the system operator locks out the normally active remote control system and activates the telephone arrangement.

This inactive condition of the telephone apparatus is accomplished at the stations by interrupting the connections from the telephone transmitter circuit to the standard handset instrument used by the personnel. This interruption is obtained over contacts of relays which are controlled through the remote control system by the system operator. At the same time, the radio apparatus at a station is also held in a nonactive condition except for the capability of indicating that a remote unit desires to initiate a telephone conversation. At the office, the telephone apparatus and circuit are also interrupted by contacts of relays which are controlled in accordance with the operator's actions in locking out the remote control system.

When an individual at a remotely controlled station desires to make a telephone call to the office, an indication is transmitted from that station during a regular remote control system indication code assigned to that station. A similar indication occurs if a remote radio unit indicates a requirement for contacting the office over the telephone-radio integrated network. In addition, the system operator can make a call to a local station phone by transmitting a telephone call signal to that location. However, such arrangements, that is, the transmission of the telephone call control, are well known and are not shown specifically in the present application. When an indication is received at the office that a telephone call is to be made from the remote station, the system operator transmits a common control code to all stations, this code being assigned exclusively for lockout purposes. The reception of this control code at each station actuates the removal of all indication tones by deenergizing the tone transmitters at the various stations. This initial common control code, as necessary, can also include a control function which will turn on the radio apparatus to actuate the telephone-radio integrated network. Upon completion of the telephone conversation, a second common or all stations control code is transmitted to restore the stations to remote control system operation. Such codes are used for no other control functions and there are no corresponding indication codes from the various remote stations at the end of the control code action.

Reception of the initial controls at the stations also prepares for connecting the station telephone apparatus to the communication channel. When transmission of the first common control code is completed, the system operator removes his own telephone handset from the hook switch. After proper checks are made of the existing conditions, this action energizes a hook switch follower relay which causes the voice frequency control tone to be removed, this action also being accomplished by deenergizing the tone transmitter at the office location. Since the control code tone, and incidentally the indication tones, are normally present in the communication channel, removal of the control tone is used to actuate a monitor relay at each station to complete the connections between the telephone handset and the telephone apparatus connected to the communication channel. The telephone network is now connected to the channel so that conversation between the office and the individual or individuals in the field locations can be held. When the situation is such that the conversation also utilizes the radio link between a station and remote unit, a radio push-to-talk switch in the office handset actuates a special voice frequency radio control tone transmitter at the office, causing the transmission of such tone over the communication channel to the field locations. This radio control tone is used to effect the transfer of the radio apparatus at a station from the receive to the transmit condition, similar to the conditioning of such aparatus by the usual push-to-talk switch in a local microphone instrument.

When the telephone conversation is completed, the system operator at the control office restores his handset to the usual hook switch location. This deenergizes the hook switch follower relay which in turn disconnects the office telephone apparatus from the communication channel. At the same time, the control tone transmitter is re-energized to continuously transmit a steady voice frequency tone over the communication channel. The system operator also again transmits a common control code to all the stations. However, at this time this coding action is actuated by a different push button in the control machine. This selected control code is similar to that transmitted to activate the telephone network, but includes a different control function which actuates the restoration action at each field location. During this action, the indication transmitter at the station is re-energized to steadily transmit its voice frequency tone. Station telephone apparatus is disconnected from the channel and the radio set, if previously turned on, is now placed in a condition active only to receive a call indication from the remote unit. At the completion of this restoration action, the remote control system is again restored to its normal active condition connected to the communication channel at all locations for the instant transmission of control or indication functions through the coding actions.

Figure 1B:
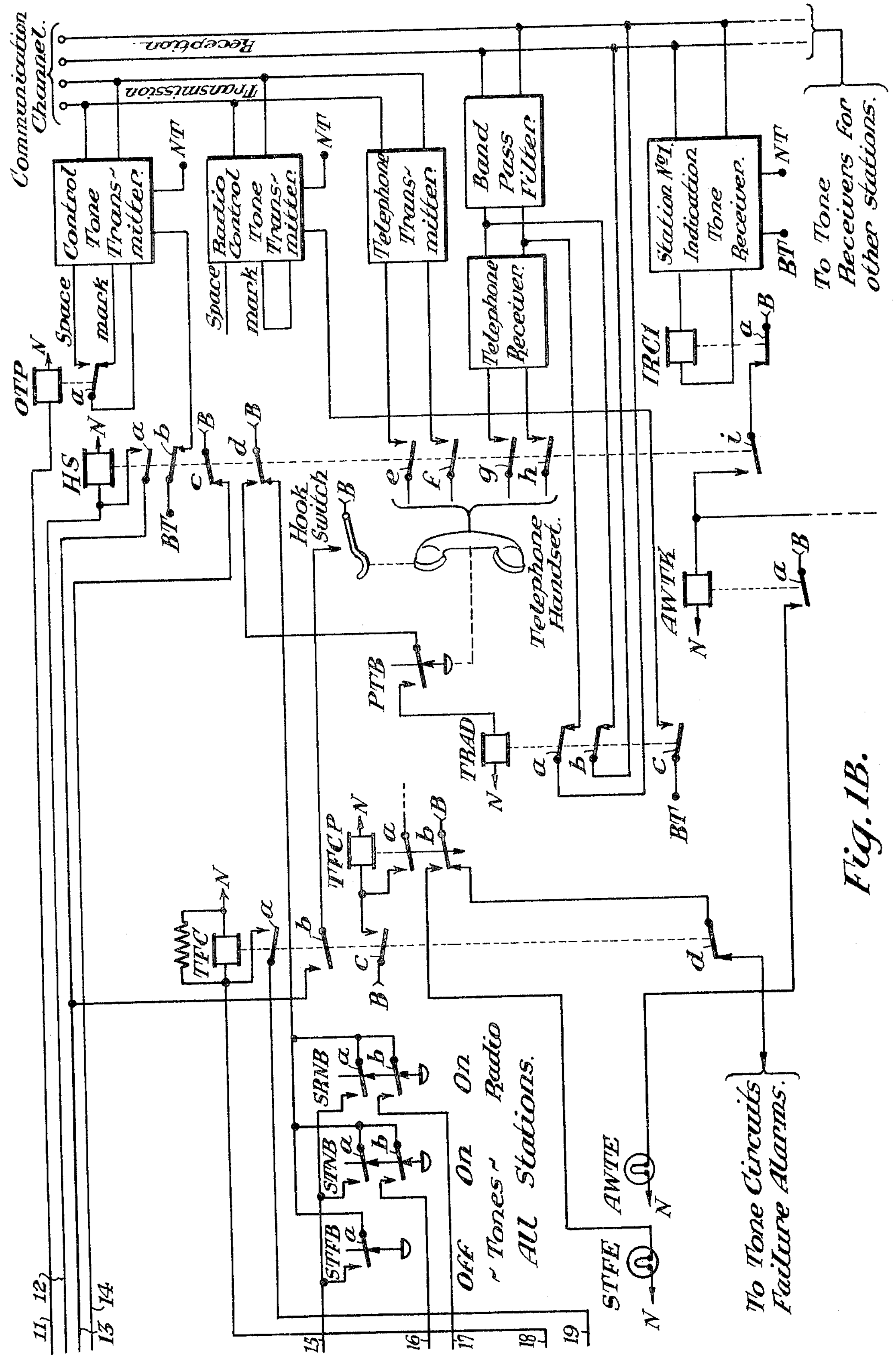

I shall now describe the operation and the apparatus of my invention in more detail, referring from time to time to the accompanying drawings in which:

FIGS. 1A and 1B, when placed adjacent with FIG. 1A to the left, show circuit arrangements at the control office location of the remote control system which embody one form of the remote control system, telephone network coordination circuits of my invention.

Figure 2:
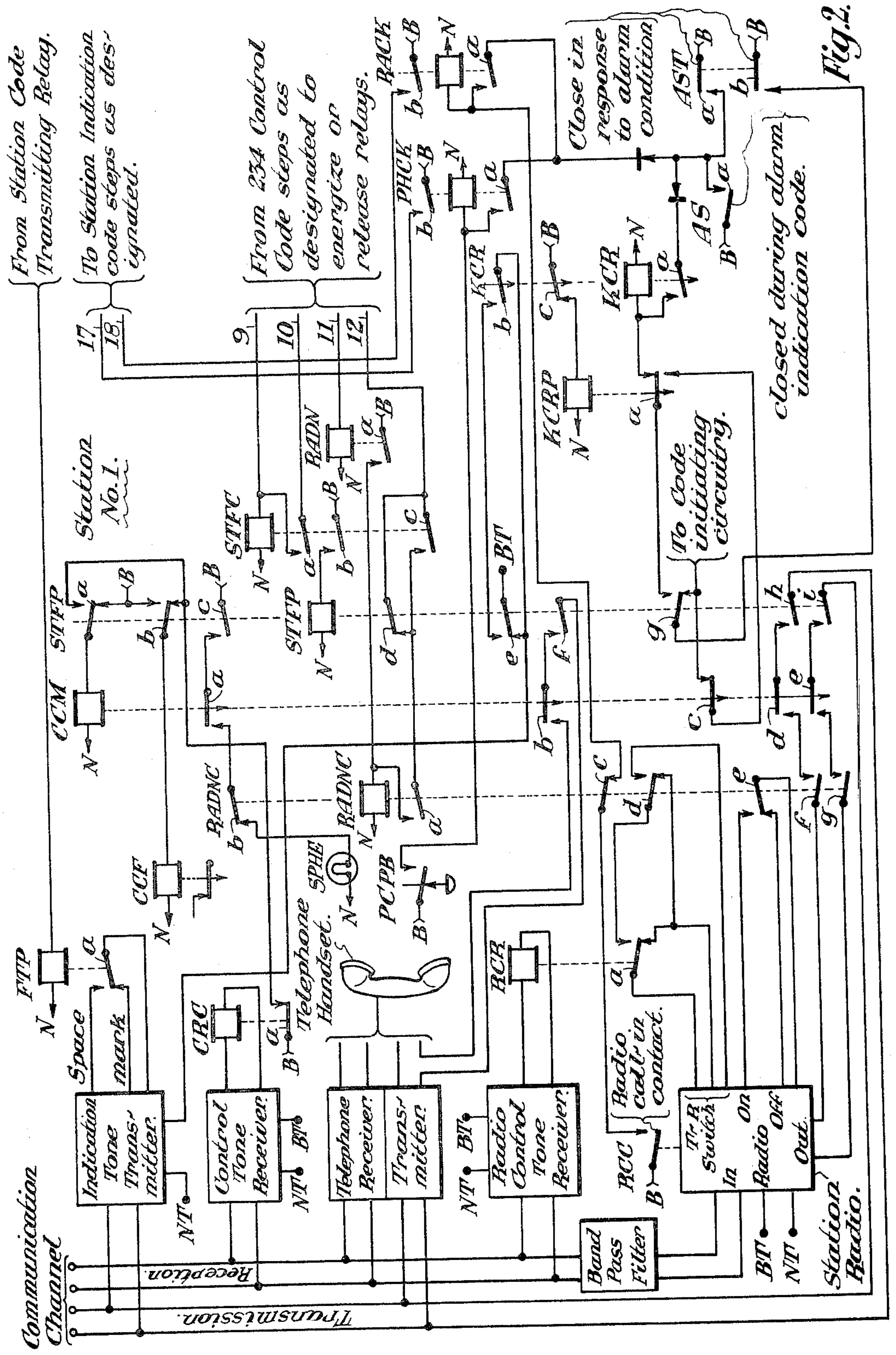

FIG. 2 illustrates the coordination circuits at one station of the remote control system, these station coordination circuits cooperating with the corresponding circuits at the office location of FIGS. 1A and 1B and embodying one form of my invention.

In each of the drawings similar reference characters refer to similar parts of the apparatus.

By way of preliminary explanation, each location shown in the drawings is provided with a source of low voltage, direct current energy which is used primarily for energizing the relays and remote control system coding apparatus. Such a source may be a battery having the proper size and capacity or a rectifier of proper output energized by a commercial alternating current source. Since such sources of direct current energy are well known in the art, the actual source is not here shown and only its positive and negative terminals are indicated by the reference characters B and N respectively. Where the reference character B or N appears in the drawings, a connection to the corresponding positive or negative terminal, respectively, of the low voltage direct current source is intended. Each location is also supplied with a source of energy for the various tone transmitters and receivers and for the radio apparatus when supplied. Energy sources for this type of apparatus are well known and may be either of the alternating or direct current type in accordance with the actual apparatus in use. I have chosen to illustrate such a source only by the reference characters for the source terminals, respectively BT and NT. Again, where such a reference character appears, a connection to the corresponding terminal of such source is intended. Some of the relays, indicated by standard symbols in the drawings, are provided with slow release characteristics. To simplify the showing, such relays are designated by downward pointing arrows drawn through the movable portion of each contact of these relays. It is to be understood that relays designated by such symbols will retain their front contacts closed for a selected period of time after the relay winding is deenergized. Each of the tone transmitters, receivers and filters is shown by a conventional block diagram. Such apparatus is well known in the art and various types may be used with equal facility. Thus none of the details are shown since the apparatus details as such are not part of my invention.

Referring now to FIGS. 1A and 1B, at the right of FIG. 1B are shown the connections of the various tone transmitters and receivers to the communication channel. These connections are shown as of the 4-wire type with separate pairs for transmission and reception of the voice frequency tones. Each transmitter and receiver is thus connected to the corresponding pair of wires of the communication circuit. It is to be understood that the communication channel may be of the line wire type, carrier current superimposed upon a line circuit, a radio circuit, or a microwave transmission system. All of these systems are well known in the art and the modifications of the channel connections for the transmitters and receivers necessary for each type of circuit are conventional and are known by those skilled in such communication arts. Actually shown is the single control tone transmitter for the remote control system, a special radio control tone transmitter which is used only when the radio apparatus at the stations is being used for telephone-radio integrated network operation, and a single tone receiver which is responsive to the frequency of the indication tone transmitted from station 1 shown in FIG. 2. Since each remotely controlled station is assigned a distinct tone for indication transmission, additional receivers are necessary for a multi-station system, as indicated by the explanatory note, one for each station in the system.

The control tone transmitter for the remote control systems is normally active, the mark or transmitting circuit being completed over back contact *a* of the office transmitting repeater relay OTP. Relay OTP repeats the operation of the office transmitting relay O1T in the office coding unit OLC shown at the left of FIG. 1A. The circuit includes a front contact *x* of relay O1T and wire 11 so that relay OTP is obviously a front contact repeater of the control unit relay. For purposes of this application, the remote control system used is assumed to be similar to that shown in Letters Patent of the United States No. 2,698,425 issued to A. B. Miller on December 28, 1954, for a Remote Control System. Reference is made to this issued patent for a full understanding of this type of coded remote control systems and only such details will be shown herein as are necessary for the complete and full understanding of the present invention. For example, only four relays are shown within office coding unit OLC at the left of FIG. 1A. These relays are designated by reference characters similar to those used in the cited patent. Explanatory notes are included to further describe these relays and no control circuits are thus shown. If full details are desired, reference is made to the cited patent for complete circuitry and operation. Station relay 234S shown adjacent to unit OLC is also similar to the S relays described in the reference patent. Relay 234S is the station relay for the common control code to all stations which coordinates the change to and from the telephone network operation. As indicated by the explanatory note, this relay is energized when the station selection portion of this common control code has been transmitted and is retained energized until the end of such coding action. Various circuits enter and leave unit OLC and notes are provided to describe the function of such circuits. The actual connections are disclosed in detail in the reference patent and such detail is unnecessary here for a complete understanding of the present invention. In summary, relay O1T in the coding unit picks up and releases during the transmission of a control code and its repeater relay OTP follows such action, causing the alternate transmission of mark and space characters from the control tone transmitter in keeping with the desired control code being transmitted.

The radio control tone transmitter marking circuit is permanently connected so that this transmitter transmits a steady tone of the selected frequency as long as power is supplied to the apparatus. However, an alternate control circuit is provided by the power supply arrangement. Although terminal NT of the apparatus power source is permanently connected, terminal BT is normally disconnected by the open front contact *c* of the radio transmission keying relay TRAD. Relay TRAD is controlled during telephone-radio integrated transmissions by the circuit extending from terminal B over front contact *d* of hook switch follower relay HS, the normally open contact of the handset push-to-talk button PTB, and the winding of relay TRAD to terminal N. This circuit will be more fully explained hereinafter during the description of the telephone transmissions. It is obvious that this radio control tone transmitter provides a tone output into the communication channel when voice transmission from the office over the telephone circuit and the integrated radio channel is desired.

As previously stated, the indication tone receiver for station 1 of FIG. 2 is shown in the lower right of FIG. 1B as an example of such receivers. There will be a similar receiver assigned to each station of the remote control system. When the corresponding tone is received, which is the normal condition, the receiver responds and energizes the corresponding receiving relay. As specifically shown, when the proper tone is received from station 1, receiving relay IRC1 is energized and in its picked up condition. When the tone is absent, the relay is deenergized and releases. When an indication code is received from the station, relay IRC1 follows the specific code received and in turn drives the receiver relay of office unit OLC. In this manner the code is received by this unit, specific reference being made to reference Patent 2,698,425 for complete details of such operation.

Telephone apparatus is also shown at the right of FIG. 1B and comprises telephone transmitter and receiver units, band pass filter, and a telephone handset. These are shown in conventional form as they are of the usual type used for transmission over voice frequency communication channels. The band pass filter connected between the telephone receiver and the channel arrangement is used to block the frequency of the output of the radio control tone transmitter previously described. It is to be noted that a similar type filter at the station location serves an equivalent purpose. Since the radio control tone transmitter output is in the voice frequency range, it will interfere with the integrated telephone-radio voice transmissions unless blocked from the final receiving arrangements of such a circuit. However, the band pass filter at this office location is normally shunted by back contacts *a* and *b* of relay TRAD. Since the radio control tone transmitter is energized only when relay TRAD picks up, it is obvious that the band pass filter is inserted in the circuit only when the tone transmitter is active. The telephone transmitter and receiver units are normally disconnected from the telephone handset by front contacts *e*, *f*, *g*, and *h* of hook switch follower relay HS which will be described in detail shortly. As shown schematically, the handset normally holds open the hook switch contact in a manner conventional for such arrangements. In addition, the contact of the push-to-talk button PTB in the telephone handset is normally in its open circuit condition.

Other control apparatus available to the system operator for the remote control system, telephone network coordination comprises three push buttons preferably mounted in the control panel for the remote control system. As shown specifically in FIG. 1B, these push buttons are defined in accordance with the action which they initiate during the coordination operation. Two of the buttons are thus associated with the control of transmission from the tone transmitters at the stations, one being used to remove the tones and the other being used to restore the tones at the end of the telephone conversation. Thus, the station-tones-off push button STFB is actuated by the operator to initiate the coordination action and remove the indication tones from the communication channel while the station-tones-on push button STNB is used to restore the remote control system to its active condition at the end of the telephone conversation by reactivating the indication tone transmitters at the various stations. The third or station-radio-on push button SRNB is used to initiate the telephone-radio integrated operation, specifically by initiating the code action to turn on the station radios. As will become apparent, this last push button is used in place of push button STFB when a radio link is to be used. The conventional symbols used to illustrate these push buttons indicate that each is of the non-stick, push-to-close contact type. In other words, all contacts of each push button are normally in their open circuit position and move to close the corresponding circuit when the push button is operated. Each contact retains a closed position as long as pressure is exerted on the push button but returns to its open circuit condition as soon as such pressure is removed.

The operation of any one of these three push buttons completes a circuit over its contact *a* for energizing the start relay 234ST which initiates the coding action for the common control code to all stations. The circuit for this relay includes back contact *d* of relay HS, contact *a* of each push button in multiple, wire 15, and the winding of the relay. When relay 234ST is energized and picks up, the closing of its front contact *d* completes the circuit which actually starts the coding action and also selects the proper common station call, here designated 234, to transmit the code to each of the remotely located stations. Relay 234ST is initially held energized, when the push button is released, by a stick circuit including its own front contact *a* and back contact *a* of relay 234S previously described. During the coding action, when relay 234S is energized and closes its front contacts, this stick circuit is extended over front contact *a* of relay 234S into the coding unit where it is maintained until the completion of the station selection portion of a code, i.e., step 8 in the reference system. These stick circuits for the start relay are the usual circuits and are described in complete detail in the aforementioned patent.

In addition, the operation of push button STNB completes a circuit extending from terminal B at back contact *d* of relay HS, over contact *b* of the push button, wire 16, and the winding of push button repeater relay TNBP to terminal N. This tones-on repeater relay, thus energized, picks up to complete a stick circuit which includes its own front contact *a* and, in multiple, front contacts *b* of relays 234S and 234ST. In a similar manner, the operation of push button SRNB energizes, by the closing of its contact *b*, the radio-on repeater relay RNBP. This relay also has a stick circuit including its own front contact *a* and front contacts *c*, in multiple, of relays 234S and 234ST. In each case, since relay 234S is held energized during the entire coding action, these push button repeater relays, once energized, remain in that condition until the completion of the common control code, thus assuring that the proper control functions are transmitted.

Since station relay 234S picks up during each common control code and remains up until the code is completed, it is obvious that energy is supplied over front contact *d* of this relay to the connection into unit OLC which controls the character of code step 9, one of the control function carrying steps of this code. When energy is thus supplied to this connection, the code step is transmitted with a long character in keeping with the time code type system herein assumed. When relay TNBP is also energized, energy is supplied during the code to the connection controlling code step 10, this circuit extending from terminal B over front contact *b* of relay TNBP and front contact *e* of relay 234S. As will appear hereinafter when the station apparatus is described, a long character code step 9 actuates the removal of the station indication tones while the transmission of both step 9 and step 10 with a long character actuates the restoring action to return the remote control system to its active state. When relay RNBP is in its picked up condition during coding action, a circuit is completed over front contact *b* of this relay and front contact *f* of relay 234S to supply energy to the connection into unit OLC for providing a long character to code step 11. Normally, with relay RNBP released, a circuit extends over back contact *b* of this relay and front contact *g* of relay 234S to cause code step 12 to have the long character. When code steps 9 and 11 are first transmitted with long characters, the station indication tones are removed and the radio sets at the various stations are prepared for operation in the telephone-radio integrated network. With relay RNBP released so that code step 12 is transmitted long, the station radios are deactivated during the first common coding action after they have been turned on to restore or initiate the restoration of the remote control system to active condition. However, the reception of a long step 12 at the stations at other times has no effect on the apparatus located there. It is to be noted that either code step 11 or code step 12 is transmitted with a long character during each common control code but the two steps can never both have this type of character simultaneously.

The office is provided with a tones-off control memory relay TFC and a memory repeater relay TFCP, the latter being provided with slow release characteristics which may be on the order of two or three seconds time duration. Relay TFC is energized at the completion of a initial common control code, that is, one actuating the removal of indication tones from the channel. The circuit extends from terminal B over front contact *x* of the chain relay OCT within coding unit OLC, front contact *h* of relay 234S, back contact *c* of relay TNBP, wire 18, and the winding of relay TFC to terminal N. When relay TFC picks ups, it closes its front contact *a* to complete a stick circuit which further includes wire 19 and back contact *x* of relay OCT. In order that relay TFC may be held energized in the event that any alarm condition indication code is transmitted during a period of telephone conservations, an alternate stick circuit includes front contact *x* of relay OCT, back contact *h* of relay 234S, and wire 19. This circuit will be complete during the reception of the final step of any such alarm indication code since relay 234S will not be energized under such conditions. Relay TFC is provided with a resistor snub to provide a small degree of retardation to bridge the transfer of its stick circuit from front to back contacts of the various relays.

As illustrated here, relay TFCP is energized by a simple circuit including front contact *c* of relay TFC and the winding of TFCP. In the event that the installation is sufficiently large to require more than one office coding unit for efficient operation, so that common control codes must be transmitted by both units, a tones off control memory relay must be provided for each such control unit. Under these conditions, the energizing circuit for the single repeater relay TFCP will include, in series, front contacts of each of the relays TFC. Under the specific illustrations here, no stick circuit is necessary for this repeater relay since it would include only a single front contact of relay TFC in addition to the illustrated front contact *a* of the repeater relay. However, in the event that additional line coding units are in use so that more than one TFC relay is provided, front contacts, in multiple, of each such relay comprise a stick circuit which assures that relay TFCP is not deenergized until all such coding units have transmitted a restoration code. The closing of front contact *b* of relay TFCP supplies energy to the station tones off indication lamp STFE. At the same time, the opening of the corresponding back contact of relay TFCP further interrupts the usual tone failure alarm circuitry provided in such systems, this circuit having been initially interrupted at back contact *d* of relay TFC.

When lamp STFE becomes lighted, the operator is informed that the common control code to remove the station tones has been transmitted and that he can now remove his handset from the hook switch. The closing of the hook switch contact completes the circuit for energizing hook switch follower relay HS. However, a check is still made that the office coding unit is in its nonactive condition, this check including back contacts of selected relays of the office timing relay chain. Specifically, the circuit for relay HS includes the hook switch contact, front contact *b* of relay TFC, wire 13, back contacts $x$ of relays O1L and O2L, wire 12, and the winding of relay HS. When relay HS picks up, the closing of its front contact $a$ completes a stick circuit which by-passes the back contacts of relays O1L and O2L but includes the hook switch contact and front contact $b$ of relay TFC. The closing of front contacts $e$, $f$, $g$, and $h$ of relay HS completes the connections from the telephone handset to the telephone transmitter and receiver apparatus. In addition, back contact $b$ of relay HS opens to interrupt the supply of energy from terminal BT to the control tone transmitter so that this transmitter is now nonactive. Further, the opening of back contact $d$ of relay HS interrupts the normal supply of power from terminal B to the control push buttons on the panel so that no inadvertent coding operation can be actuated or attempted during the telephone conversation. Utility of other contacts of relay HS will become apparent during the description hereinafter.

Referring now to FIG. 1A, shown near the bottom are two of the indication registry relays associated with the remote control system, relays R17 and R18. These relays are used to temporarily store incoming indications during the coding action, each relay being energized when the correspondingly numbered indication code step has a long character. This occurs during the reception of an indication code from any station. However, the illustrated indication delivery relay 1DK is assigned specifically to the codes from station 1, this relay being energized during the final code step of such incoming indication codes. Indication stick relays K9 and K10 shown in FIG. 1A are also specifically associated with station 1 and are used to store the indication received, respectively, on indication code steps 17 and 18. As an example, relay K9 is energized by a circuit extending from terminal B over the front contact of relay R17, front contact $c$ of relay 1DK, and the winding of relay K9 to terminal N. A similar circuit for relay K10 includes front contact $a$ of relay R18 and front contact $d$ of relay 1DK. Each indication stick relay has a stick circuit including its own front contact $a$ and the back contact of relay 1DK corresponding to the front contact included in its energizing circuit.

Relays such as K9 and K10 are frequently included in indication modules in which standardized circuits may be used. Since other specific controls are desired for the indications of phone calls and radio calls from the stations, two additional relays are provided to repeat, for circuit convenience, the condition of relays K9 and K10. The station 1 phone call indication relay PHK1 is thus controlled by an energizing circuit including front contact $a$ of relay 1DK and front contact $b$ of relay K9. The stick circuit for relay PHK1 includes its own front contact $a$, wire 14, back contact $c$ of relay HS. Thus, if an indication code from station 1 includes a long character step 17 so that relay K9 is energized, relay PHK1 will also be energized during the last step of that code, that is, relay 1DK picked up. Therefore, when the energizing circuit is interrupted by the release of relay 1DK, relay PHK1 is held energized by its stick circuit until relay HS is later energized. A similar station 1 radio call indication relay RADK1 is controlled by front contacts $b$ of relays 1DK and K10. The stick circuit for relay RADK1 is the same as for relay PHK1 except for including front contact $a$ of relay RADK1. Indication lamps and, if desired, audible warnings not here shown are provided to indicate, to the system operator, a phone call request from a station or a radio call request from some remote location. Phone call lamp PHE is controlled or energized over front contact $b$ of relay PHK1 and also, in multiple, over front contact $c$ of relay K9. Similar circuits for radio call lamp RADE include front contact $c$ of relay K10 in multiple with front contact $b$ of relay RADK1.

One other relay is provided at the office location, the alarm-while-talking indication relay AWTK, shown in FIG. 1B. This relay is energized to register the existence of a critical alarm condition at any station during the period of time that the telephone or radio network is active and the remote control system is locked out. A typical circuit for controlling this relay includes front contact $a$ of relay IRC1 and front contact $i$ of relay HS. Other similar circuits, each including a front contact of relay HS and a front contact of the indication receiver relay for a different station, are represented by the conventional dotted line connected to the winding of relay AWTK. As will become apparent later, the station circuit arrangement is such that critical alarm conditions which may occur during telephone conversations activate the station indication tone transmitter to send a steady tone to the office location. Such a tone, of course, is received by the corresponding tone receiver at the office resulting in the energization of the associated relay. As typically shown for station 1, such action causes relay IRC1 to pick up, closing its front contact $a$. Since relay HS is energized during the time that the telephone handset is removed from the hook switch after the telephone network has been activated, the circuit is then complete so that relay AWTK picks up, closing its front contact $a$ to energize the alarm-while-talking indication lamp AWTE. If desired, an audible alarm arrangement may also be provided and actuated by this relay. The action on the part of the system operator under such conditions will be discussed during the operational description of this system.

Referring now to FIG. 2, wherein is shown the apparatus and circuit arrangement at station No. 1 of the remote control system, illustrated at the left of this figure are the communication channel connections shown as being of the 4-wire type to agree with those illustrated at the control office. As previously stated, the actual connections used depend upon the type of communication channel in service. At the top left is shown the indication tone transmitter for this station and the control tone receiver. This receiver is responsive to the single control frequency tone transmitted from the office location. When such tone is being received, the control receiver relay CRC is energized. It is obvious, then, that this relay CRC follows the steps of control codes transmitted from the office location but is normally in its energized condition in keeping with the normally active state of the control tone transmitter at the office. The frequency generated by the indication tone transmitter is unique in the remote control system and thus distinctly identifies station No. 1. As is obvious, this transmitter is normally active since its marking circuit is normally completed over back contact $a$ of field transmitting repeater relay FTP. Relay FTP repeats the operation of a field transmitter relay included in the station line coding unit which is not here shown but which is similar in design and operation to office coding unit OLC. Reference is made to the previously mentioned Patent 2,698,425 for a complete showing and description of such station transmitting units. Briefly described, relay FTP, being a front contact repeater of the station transmitting relay, is normally deenergized and in its released condition. This relay follows any coding action by the station coding unit as controlled by the field transmitter relay. Relay FTP thus acts to code the output of the indication tone transmitter to cause the transmission of the desired code to the office location carrying such indication functions as may be appropriate at the particular time.

The radio control tone receiver is responsive only to the frequency generated by the radio control tone transmitter at the office. When such a tone is received, this receiver energizes the radio control relay RCR. Since the radio control tone transmitter is normally inactive, as previously illustrated, this relay is normally deenergized and in its released condition. The station radio apparatus is shown in the lower left of the drawing illustrated by a conventional block diagram since any type of voice radio which will fulfill the following described functions may be used in this system. The voice input from the office telephone is received over the reception pair of wires connecting with the communication channel and through a band pass filter to the input terminals of the radio apparatus. This band pass filter is similar to that used at the office and serves to block the radio control voice frequency tone and prevent its further transmission by the radio apparatus. This radio control tone will interfere with the telephone conversation and in addition its transmission over the radio is unnecessary.

The output terminals of the radio apparatus are connected to the transmission pair of connections to the communication channel only when the conditions are proper for such operation. The connecting links include front contacts *h* and *i* of a station tones off repeater relay STFP, back contacts *d* and *e* of control circuit monitor relay CCM, and front contacts *f* and *g* of radio-on control relay RADNC. These relays will be described in detail hereinafter. It is also obvious that the radio apparatus on control circuit is only complete when relay RADNC is energized and closes its front contact *e*. This eliminates unnecessary energization of the radio apparatus with resultant waste of energy. Further, the radio transmitter is suppressed except when the radio control tone is received from the office and relay RADNC is picked up. In other words, the transmit, receive switch connections are completed for transmitter operation only over front contact *a* of relay RCR and front contact *d* of relay RADNC. Both of these front contacts must be closed to actuate the radio transmitter to relay voice transmissions, received by telephone from the office through space to the remote location. However, the radio apparatus must be capable of receiving a call from the remote locations and signaling the office location at any time. The radio station is thus designed to receive such a call signal from the remote station and close a contact RCC. The closing of this latter contact actuates the transmission of a regular station indication code during which a selected step is given a long character to carry the radio call signal. When contact RCC is closed, and if a radio-on control has not been received, a circuit is completed from terminal B over contact RCC in its closed condition, back contact *c* of relay RADNC, and the winding of radio call indication relay RACK to terminal N. When this relay, thus energized, picks up, it initiates the transmission of an indication code and over its front contact *b* causes code step 18 to have a long character to carry the call signal.

The telephone apparatus, a transmitter, a receiver, and a handset, are shown at the left center of the drawing. The handset and the receiver are permanently connected but the connection between the handset and the telephone transmitter are normally interrupted at the open front contact *f* of relay STFP and open back contact *b* of relay CCM, these relays having been previously defined. Associated with the telephone apparatus is a phone call push button PCPB and a station phone call lamp SPHE. Push button PCPB is used to signal the office to indicate a desire for a telephone conversation. This push button is of the non-stick, push-to-close type previously defined for the office location. Lamp SPHE displays an indication to local personnel when the telephone apparatus is connected and ready for use. The circuit for this lamp includes front contact *c* of relay STFP, back contact *a* of relay CCM, and back contact *b* of relay RADNC. This latter contact interrupts the circuit when the telephone apparatus is otherwise in active condition if the conversation is to be further transmitted by the radio apparatus to a remote unit and telephone conversation is not desired locally. The actual function of this energizing circuit for the lamp will be further described as the description progresses.

The operation by local personnel of push button PCPB energizes phone call indication registry relay PHCK over an obvious circuit. The closing of front contact *b* of relay PHCK upon its energization actuates the transmission of a regular indication code from this station, contact *b* further providing energy into the coding unit to give code step 17 a long character to carry the phone call request to the office. It is here assumed that relay PHCK is assigned to the alarm code station call so that a stick circuit is provided for relay PHCK over back contact *a* of the alarm start relay AST in multiple with front contact *a* of the alarm station relay AS. These stick circuits hold relay PHCK energized until the code is completed to assure that the proper character will be given to code step 17. Function, circuits, and operation of the relays controlling the contacts AST and AS may be found in detail in the previously mentioned reference patent and are so well known that no further details are necessary here. It is to be noted that a similar stick circuit arrangement is provided for previously described relay RACK. Each of these CK relays, of course, releases at the end of the coding action.

Reception of the initial common or 234 control code at station 1 causes the energization of the station tones off control relay STFC. This initial code, as previously described in connection with the office location, is transmitted with step 9 having a long character so that energy is supplied over the connection from the station coding unit to the winding of relay STFC. Closing of front contact *a* of this relay completes a stick circuit, extending from the coding unit, which is held closed as long as that unit is inactive and until a common code is received in which code step 10 has a long character. In other words, the reception of a common or 234 control code at this station having step 10 long causes the interruption of both the energizing and stick circuits for relay STFC. Thus this relay will release upon the reception of such a restoration code.

When relay STFC is initially energized, the closing of its front contact *b* completes an obvious circuit for energizing its repeater relay STFP which was previously defined. When relay STFP picks up, its contact *b* transfers the control circuit failure relay CCF from control by front contact *a* of relay CRC to a direct connection to terminal B over front contact *b* of relay STFP. This is necessary since relay CCF, a slow release relay, is used to detect the continued absence of the control code tone at this station under normal circumstances. Thus, since the control tone will eventually be removed in order to activate the telephone network, relay CRC must be held energized by an alternate circuit during this period. Contact *a* of relay STFP transfers control circuit monitor relay CCM from a direct connection to terminal B over back contact *a* to control by front contact *a* of relay CRC over front contact *a* of relay STFP.

The closing of front contacts *c* and *f* of relay STFP prepares the circuits for lamp SPHE and for connecting the telephone transmitter to the handset. The opening of back contact *e* of relay STFP interrupts the connection from terminal BT of the power source to the indication tone transmitter, front contact *b* of a relay KCR being open at this time. This deenergizes the indication tone transmitter, removing that tone from the communication channel. A similar action occurs also at the other stations to remove the other indication tones. The opening of back contact *g* of relay STFP interrupts the code starting circuit for the alarm codes which is normally completed at back contact *b* of relay AST, previously discussed. As also previously discussed, front contacts *h* and *i* of relay STFP are closed at this time in the circuit connecting the output of the radio apparatus to the communication channel. However, these circuit connections are not yet complete because of other contacts which are open.

When the operator at the control office lifts his telephone handset from the hook switch and thus actuates the removal of the control tone from the communication channel, relay CRC at this station is deenergized and releases. The opening of front contact *a* of relay CRC deenergizes relay CCM which, at the end of its slow release period, releases its contacts. If the radio apparatus has not been activated, the closing of back contact *a* of relay CCM completes the circuit for lamp SPHE to indicate to local personnel that the phone connections are prepared for conversation. At the same time, the closing of back contact *b* of relay CCM completes the connection from the telephone handset to the telephone transmitter to actually make the phone circuit ready for use. Also at the same time, back contacts *d* and *e* of relay CCM close in the output circuit for the radio apparatus to further prepare this connection to the communication channel for radio use if desired. However, front contacts *f* and *g* of relay RADNC are still open in these circuit connections under the presently assumed conditions. The various telephone sets at the stations may now be used to carry on a conversion between the station personnel and the system operator at the control office. At the end of the conversation, the system is restored to the remote control arrangement in a reverse manner.

If step 11 of the initial common control code is also of a long character together with step 9 as previously described, the radio-on relay RADN is energized during the reception of this code. Relay RADN closes its front contact *a* to complete an obvious circuit for energizing the radio-on control relay RADNC. This latter relay closes front contact *a* to complete a stick circuit extending from the coding unit and held complete within the unit until a long step 12 is received during another code. This stick circuit also includes the multiple connection over front contact *c* of relay STFC and back contact *d* of relay STFP. Relay RADNC is thus held energized until a common control code is received with a long step 12 or until relay STFC is released by a restoration code which may inadvertently not contain a long step 12. As previously described in connection with the office, steps 11 and 12 of a common control code can never both be long at the same time. It is to be noted that relay RADN releases at the end of the reception of the control code since this relay is not provided with any stick circuit. The pick up of relay RADNC to close its front contact *e* actuates the radio apparatus to its on condition. At the same time, the closing of front contacts *f* and *g* of this relay completes the connections from the output terminals of the radio apparatus to the communication channel to allow the transmission of the voice currents to the office location. The closing of front contact *d* of relay RADNC (as previously discussed) prepares the circuit for the transmit-receive switch of the radio apparatus, and thus the radio itself, to be actuated between its transmit and receive condition by the operation of contact *a* of relay RCR.

The radio or telephone-on condition holds until the remote control system is restored to its active condition by the system operator at the end of the voice communication period. If an alarm condition at this station occurs during this period of telephone conversation which should be immediately reported to the office, the release of contacts of the alarm start relay AST in response to the alarm condition actuates the energization of the indication circuit return relay KCR. This energizing circuit includes back contact *b* of relay AST, front contact *g* of relay STFP, front contact *a* of the normally energized indication circuit return repeater relay KCRP, and the winding of relay KCR. The closing of front contact *a* of relay KCR completes stick circuit for this relay including, initially, back contact *a* of relay AST and later, during coding action, front contact *a* of station relay AS. The closing of front contact *b* of relay CR under the existing conditions completes an alternate circuit for energizing the indication tone transmitter at this station location, the circuit from terminal BT being completed over front contact *e* of relay STFP and front contact *b* of relay KCR. A steady tone is thus transmitted over the communication channel to the office location under these conditions to register the existence of an alarm condition and to indicate such to the operator by the lighting of lamp AWTE. The opening of back contact *c* of relay KCR deenergizes its repeater relay KCRP which, having slow release characteristics, releases after a preselected period of time which may be, for example, on the order of two seconds. If the system operator temporarily restores the control tone transmission from the office at this time by returning his handset to the hook switch in response to the display of the alarm condition indication, relay CCM at the station is energized and picks up. This completes the circuit for starting an indication code to transmit the alarm condition to the office. The starting circuit, with the telephone network active, includes back contact *b* of relay AST, front contact *g* of relay STFP, back contact *a* of relay KCRP, and front contact *c* of relay CCM. Completion of this indication code will interrupt the stick circuit for relay KCR, allowing it to release at the end of a slow release period. The following pick up of relay KCRP restores the indication circuit return relays to their normal conditions.

I shall now describe a complete coordination action of the system shown, through the operation of locking out the remote control system, connecting the telephone arrangement for use, and then restoring the remote control system to its active condition. The arrangement is initially assumed to be in the condition shown in the drawings, that is, the remote control system active and on the line so that control and indication codes may be transmitted between the office and the various stations in the usual manner. Relays OTP and FTP at the office and station, respectively, thus repeat the code originated by the associated coding unit and drive the corresponding tone transmitters to transmit the desired functions over the communication channel to the other locations. It is now assumed that a telephone conversation is necessary between personnel at station 1 and the system operator at the control office. Under most conditions, the phone call request is originated by the personnel at the station. However, such phone calls may be originated by the system operator transmitting a call to a particular phone by the regular control code to the corresponding station. For example, such a call may be directed to a phone in the home of a system maintainer near the location of one of the remote stations. This optional arrangement is not shown as it is a normal function of this control system and not part of the present invention.

In either case, the station phone call button PCPB (FIG. 2) is operated to indicate a desire for or the response to the phone call. The closing of the contact of this push button energizes relay PHCK which closes its front contact *b* to initiate a regular station indication code. This code is transmitted in the usual manner to the office, step 17 of the code being provided a long character to transmit the telephone call request or response. At the office, this code causes the energization of relay R17 (FIG. 1A). At the end of the code relay 1DK is energized, since the code originated at station 1, and picks up to close its front contact *c* to complete the circuit for relay K9 which is also associated with station 1. The closing of front contact *b* of relay K9 completes the circuit, also including front contact *a* of relay 1DK, for energizing relay PHK1 which picks up to close its front contact *a* and thus complete a stick circuit further including wire 14 and back contact *c* of relay HS in FIG. 1B. When relay 1DK releases upon the completion of the indication code, relays K9 and PHK1 remain energized by their stick circuits. Indication lamp PHE is lighted at this time by energy over front contact *c* of relay K9 or front contact *b* of relay PHK1. This indicates to the system operator that a phone call request has been received from station 1, this lamp being particularly associated with the panel for station 1 in the control machine.

If there is no pressing need for using the remote control system, the system operator now initiates a common or 234 control code to all stations by actuating push button STFB. The closing of contact *a* of this push button completes the circuit, further including back contact *d* of relay HS and wire 15, for energizing start relay 234ST which picks up to complete its usual stick circuit including back contact *a* of relay 234S. The closing of front contact *d* of relay 234ST initiates the control coding action, relay 234ST assuring that the station selection call in this code is 234 which selects all stations for the coordination action. Since relay 234S picks up at the end of the station call portion of this coding action, its front contact *d* is closed to complete the circuit to the coding unit for providing a long character to code step 9 during the transmission of this code. It is to be noted that, with back contact *b* of relay RNBP closed, code step 12 will also have a long character but this is incidental to the present operation and need not be further considered.

During the last step of this control code, relay OCT is energized and picks up to complete the circuit for energizing relay TFC. This circuit includes front contact *x* of relay OCT, front contact *h* of relay 234S, back contact *c* of relay TNPB (to assure that the tones-on push button has not been operated), wire 18, and the winding of relay TFC. When relay OCT releases at the end of the code, its back contact *x* completes a stick circuit for relay TFC. Relay TFCP is now energized to repeat the action of relay TFC and the closing of front contact *b* of this latter relay completes the circuit for lamp STFE to indicate to the dispatcher that the station tones-off code has been transmitted. At the same time, the opening of back contacts *b* and *d* of relays TFCP and TFC, respectively, interrupts the circuits for the indication tone failure alarms since the deliberate removal of these indication tones must not cause the sounding of an alarm indication.

At station 1 in FIG. 2, reception of this common control code causes the energization of relay STFC which picks up to complete a stick circuit which holds this relay energized until the reception of the restore code from the office. Relay STFP is also energized as a result of the pick up of relay STFC. Relay STFP, as previously explained, at its contact *b* transfers the control of tone failure indication relay CCF to a direct connection to terminal B and at its contact *a* transfers the control of relay CCM from a direct connection to terminal B to a connection to terminal B over front contact *a* of relay CRC. This latter circuit, when the control tone eventually is removed, will be interrupted by the release of relay CRC to cause a corresponding release of relay CCM. Similar action occurs at all other stations of the system so that all stations being the operation of transferring to the telephone network.

When the transmission of the 234 common control code is completed, as is indicated at the office by the lighting of lamp STFE, the system operator removes his telephone handset from the hook switch. Assuming that coding unit OLC is nonactive, the closing of the hook switch contact completes the energizing circuit for relay HS, front contact *b* of relay TFC already being closed. Relay HS, thus energized, picks up and completes its stick circuit which by-passes the timing relay contacts in the office coding unit. The opening of back contact *c* of relay HS interrupts the stick circuit for relay PHK1 which immediately releases, its energizing circuit already having been interrupted. As previously described, front contacts *e* to *h* of relay HS connect the telephone handset at the office with the telephone transmitter and receiver apparatus. In addition, the opening of various back contacts of relay HS deenergize the control tone transmitter and remove the local source of energy from the connection to the push buttons so that they are no longer capable of initiating any coding action.

The system operator now listens to the communication channel. If any voice frequency tone is heard, that is, some tone transmitter has not been deenergized, certain of the previously mentioned steps must be repeated in order to remove all of the indication tones from the communication channel. However, if the communication channel is quiet, that is, no voice frequency tones are heard, the system operator knows that the coordinated changeover to the telephone network has been properly completed.

At the station, the removal of the control tone from the communication channel actuates the release of relay CRC, opening its front contact *a* to deenergize relay CCM which releases at the end of its slow release period. The closing of back contact *b* of this latter relay completes the circuit connection between the telephone handset and the telephone transmitter apparatus, front contact *f* of relay STFP having previously been closed. The closing of back contact *a* of relay CCM completes the circuit for lamp SPHE to indicate to station personnel that the telephone has been connected to the line circuit and is ready for operation. Since the coordinated changeover has now been completed at both the office and station location, the telephone conversation may be held with no interference from the remote control system voice frequency tones. Since the remote control system is locked out at the present time, there is no possibility that the voice frequency telephone conversation can interfere with any transmitted control or indication codes to cause the reception of incorrect and undesired functions.

If the original call comes from the remote radio unit, it is received at station 1 by the radio set which in response to the call signal actuates switch RCC. Assuming no previous radio operation, closing the contact of switch RCC energizes relay RACK. As previously decribed, when relay RACK picks up, it initiates a regular station indication code which is transmitted with step 18 having a long character. Reception of this code at the office energizes relay R18 during the code and, on the final step when relay 1DK picks up, relays K10 and RADK1 are energized. The closing of front contacts of these latter relays causes the illumination of lamp RADE to indicate to the system operator that a radio call request has been received at station 1.

The operator's response to this radio call indication is similar to that which occurs when a telephone call is received, as previously described, except that push button SRNB is actuated under the present circumstances. This action causes the energization of relays RNBP and 234ST. The latter relay completes its usual stick circuit while relay RNBP is held energized initially by the stick circuit including front contact *c* of relay 234ST. This relay action, as before, initiates the transmission of a common 234 control code to all stations. Under present conditions, with relay RNBP picked up so that its front contact *b* is closed, this common control code is transmitted with steps 9 and 11 having a long character while steps 10 and 12 are of short character. In the usual manner, relays 234ST and 234S are released by the end of the coding action while relay RNBP is also deenergized after the code is completed, its stick circuit and its energizing circuit both being open at this time.

At station 1, the reception of the code is similar to that described when a telephone coordination action is initiated except that relay RADN is also energized in addition to relay STFC, since code step 11 is received having a long character. As a result, both relays STFP and RADNC are immediately energized and pick up. As previously explained, relay RADN releases at the end of the coding action since it is not provided with a stick circuit. However, relays STFC and RADNC are each provided with a stick circuit completed within the field station coding unit so that these relays are held energized until a subsequent common control code is received having different characteristics. Relay STFP likewise remains energized since it is energized solely over a front contact of relay STFC. In addition to the action previously described, under the present conditions the closing of front contact *e* of relay RADNC actuates the radio apparatus at this station to the full operating condition while the closing of front contact *d* of relay RADNC transfers the circuit controlling the transmit-receive switching arrangement of the radio set to the control of relay RCR. When relay CCM releases upon the removal of the control tone from the communication channel, the output of the radio set is connected to this communication channel by the closing of back contacts *d* and *e* of relay CCM, the front contacts of relays STFP and RADNC in these circuit connections having previously closed. It is to be noted that the input to the radio set is permanently connected to the communication channel through the band pass filter for reception of the voice frequency currents from the office. The closing of back contact *a* of relay CCM does not at this time energize lamp SPHE since back contact *b* of relay RADNC is open. Preferably, simultaneous conversation between the office, the remote radio unit, and local station personnel does not occur.

At the office, when lamp STFE indicates that the common control code has completed, the operator removes his handset from the hook switch to initiate the actions previously described. If the coordinated changeover has properly occurred, the system operator then talks into his handset but operates the push-to-talk button PTB in order to assure that his conversation is retransmitted by the radio apparatus at the station. With front contact *d* of relay HS already closed, the closing of the contact of push button PTB completes the circuit for relay TRAD which, thus energized, picks up. The opening of back contacts *a* and *b* of this latter relay incidentally insert the band pass filter into the connections between the communication channel and the office telephone receiver to block the radio control tone. However, more important, the closing of front contact *c* of relay TRAD completes the circuit for energizing the radio control tone transmitter which, with its marking circuit permanently connected, immediately transmits the selected frequency tone over the communication channel. At the station, the reception of this selected voice frequency tone, which incidentally is blocked from reception by the radio apparatus by the station band pass filter, causes the radio control tone receiver in response to energize relay RCR. Contact *a* of this relay shifts position to actuate the transmit circuit of the radio apparatus, front contact *d* of relay RADNC having previously been closed. The operator's telephone conversation is thus received by the radio apparatus, in its transmitting condition, and is retransmitted through space to the remote radio unit. When the system operator is not speaking, he of course releases the push-to-talk botton in his handset, thus removing the radio control tone from the channel, causing relay RCR at the station to release. The closing of back contact *a* of relay RCR returns the radio apparatus to its receive condition so that the transmission from the remote radio unit may be received and retransmitted by the output circuit over the communication channel to the system operator's phone apparatus.

Let us now assume that, with the system changed over to the telephone or radio conversation condition, an alarm condition occurs at station 1 which should be reported to the office without waiting for the remote control system to be restored at the end of the telephone conversation. Such alarm conditions are so assigned to the remote control system station call selections that this condition causes the release of the selected alarm start relay AST in the usual manner of such systems. As previously indicated, the closing of back contact *b* of relay AST completes a circuit, further including front contact *g* of relay STFP and front contact *a* of relay KCRP, for energizing the indication circuit return relay KCR which picks up to complete a stick circuit which initially includes back contact *a* of relay AST. The opening of back contact *c* of relay KCR deenergizes its repeater relay KCRP which releases at the end of its slow release period. Further, the closing of front contact *b* of relay KCR completes an alternate circuit for energizing the indication tone transmitter at this station, the circuit further including front contact *e* of relay STFP. This action causes the transmission of a steady indication tone over the communication channel.

When the indication tone from station 1 is received at the office location, the corresponding indication tone receiver in response thereto energizes relay IRC1. With front contact *i* of relay HS already closed, the reclosing of front contact *a* of relay IRC1 completes the circuit for energizing the alarm-while-talking relay AWTK which picks up, causing its front contact *a* to energize warning lamp AWTE. Upon hearing the indication tone in his telephone receiver and seeing the warning lamp lighted, the system operator is notified that an alarm condition exists at a station which should be reported to the office. He terminates temporarily the telephone conversation and hangs up his handset on the hook switch. This causes the deenergization and release of relay HS which closes its back contact *b* to reenergize the control tone transmitter to restore the transmission of this tone to the communication channel. No other action is taken by the system operator at this time nor does the action of the other contacts of relay HS enter into the persent operation.

When the control tone is received at station 1, the control tone receiver in response thereto energizes relay CRC which in turn reenergizes relay CCM. The opening of back contacts *a* and *b* of relay CCM extinguishes telephone indication lamp SPHE and disconnects the telephone handset from the telephone transmitter apparatus. In addition, with back contact *a* of relay KCRP closing shortly thereafter or already closed depending upon the elapsed time, the closing of front contact *c* of relay CCM completes the alternate circuit for initiating an indication code start. This circuit further includes back contact *b* of relay AST and front contact *g* of relay STFP. Thus, an indication code is transmitted to carry the alarm condition indication to the office location. During the transmission of this code, relay KCR is held energized by a second stick circuit which includes front contact *a* of the corresponding station selection relay AS. At the end of the code, when contact *a* of relay AS opens, relay KCR is deenergized and shortly releases. This closes its back contact *c* to reenergize relay KCRP which picks up to interrupt the alternate code starting circuit. After the completion of the indication code, the system operator can again remove his telephone handset from the hook switch and restore the telephone arrangement to its active condition to complete the conversation with personnel at any of the remotely controlled stations. Thus an alarm condition warning is transmitted to the office by temporary interruption of the telephone network active condition and the reception of such necessary alarm condition indications at the office location are not unnecessarily delayed.

At the close of a telephone or radio conversation, the system operator at the office restores his handset to the hook switch. The opening of the hook switch contact interrupts the stick circuit for relay HS which releases to disconnect the handset from the telephone transmitter-receiver apparatus and to reconnect the power source to the control tone transmitter which immediately transmits its control tone over the communication channel. The system operator then actuates push button STNB, whether telephone or radio conversation has previously been conducted. With relay HS released to close its back contact *d*, the operation of this push button energizes starting relay 234ST and also relay TNBP, each relay picking up to complete a stick circuit, the initial stick circuit for relay TNBP including front contact *b* of relay 234ST. With this latter relay picked up, the transmission of a common control code is initiated during which station relay 234S is energized and picks up. Front contact *b* of this relay 234S completes a second stick circuit for relay TNBP to hold this relay energized until the completion of the code. It is to be seen that code steps 9, 10 and 12 of this code are transmitted with long character. During the last step of the code, relay OCT picks up and the opening of its back contact *x* interrupts the existing stick circuit for relay TFC, back contact *h* of relay 234S already being open. Since back contact *c* of relay TNBP is also open, both the energizing and stick circuits for relay TFC are interrupted and this relay releases. This deenergizes also relay TFCP which releases at the end of its slow release period which is sufficiently long to allow the restoration action to complete. When it does release, relay TFCP extinguishes the station tones off lamp STFE.

Reception of the control tone at the station location actuates the control tone receiver which in response energizes relay CRC. The closing of front contact *a* of this relay reenergizes relay CCM since front contact *a* of relay STFP is still closed. The opening of back contacts of relay CCM interrupts the energization of telephone indication lamp SPHE, interrupts the connection of the radio output circuit to the communication channel (if this apparatus has been in use), and also interrupts the connection between the telephone handset and the telephone transmitter apparatus.

When the immediately following common control code is received with steps 9, 10 and 12 of a long character, relay STFC is deenergized by the combination of steps 9 and 10 long and immediately releases. This results in the deenergization and release of relay STFP. With code step 12 long, the stick circuit for relay RADNC (if this relay was previously energized) is also interrupted and this relay likewise releases. The release of this latter relay, in addition to further opening the connections between the radio apparatus output terminals and the communication channel, interrupts the transmit-receive switching circuitry of the radio apparatus and restores the radio set to its normal off condition.

Release of relay STFP restores the normal connection from terminal BT of the power source to the indication tone transmitter, activating this transmitter to immediately transmit a steady tone signal. Release of relay STFP further interrupts the connection between the telephone handset and the telephone transmitter apparatus. Contacts *b* and *a* of relay STFP shift their position to restore relay CCM to a direct connection to terminal B over back contact *a* of relay STFP and relay CCF to its usual control circuit which includes front contact *a* of relay CRC so that relay CCF may detect any failure of the control circuit tone. Also, back contact *g* of relay STFP restores the usual starting circuit for the alarm conditions assigned to station call selection of relay AST. At the completion of the station action and with the release of relay TFCP at the office at about the same time, the entire system is restored to its normal condition, that is, with the remote control system active and connected to the communication channel and capable of transmitting control and indication codes between the office location and the various stations.

Although I have herein shown and described but one form of circuit arrangement for coordinating the joint use of a single communication channel by a remote control system using voice frequency tones and a voice frequency telephone network, it is to be understood that various changes and modifications may be made therein within the scope of the appended claims without departing from the spirit and scope of my invention.

Having thus described my invention, what I claim is:

1. A coordination arrangement for a remote control system and a telephone network using the same communication channel and transmitting signals having similar characteristics, said remote control system being normally active to transmit control and indication functions between a control office and a plurality of remote stations, each location connected to said channel and further provided with local telephone apparatus, comprising in combination, (a) a manually actuated means at said office having connections to said remote control system for initiating the transmission of a telephone request control function when operated to a first condition, (b) a first means at each station controlled by said remote control system for locking out that station indication transmitter when said request control function is received, (c) a transfer means at said office jointly controlled manually and by said remote control system for locking out the office control transmitter and for connecting the telephone network to said channel at the office when said request control function has been transmitted, (d) a second means at each station controlled through said channel by said transfer means for completing the station telephone connections to said channel after said office transmitter is locked out, (e) said manually actuated means further controlling said remote control system for transmitting another control function to unlock the indication transmitters at said stations and to interrupt the station telephone connections to said channel when said manually actuated means is operated to a second condition and said transfer means has operated to unlock said office control transmitter.

2. In a composite communication arrangement including a normally active remote control system and a normally inactive telephone network connected to a single communication channel for transmitting signals having a similar characteristic in each direction between a control office and a plurality of stations connected at separated locations to said channel, the combination comprising, (a) a control means at said office operable to a first and a second condition and having connections to said remote control system for initiating the transmission of a first and a second signal as said control means is in its first and second condition respectively, (b) a first means at each station controlled by said remote control system for locking out the transmission of control system signals when a first signal is received, (c) a manual switch at said office operable to an active position when the office telephone apparatus is to be used, (d) a transfer means at said office jointly controlled by said manual switch and by said remote control system for connecting the office telephone apparatus to said channel and locking out the transmission of control system signals after said first signal has been transmitted and said manual switch occupies its active position, (e) a second means at each station controlled over said communication channel by said transfer means for connecting the station telephone apparatus to said channel when the control system office transmissions are locked out, (f) said control means being further controlled by said transfer means for initiating transmission of a second signal only when said manual switch is returned to a nonactive position, (g) said first and said second means being further controlled by said remote control system for interrupting the station telephone connections and removing the lock out of the station transmitter when said second signal is received at that station.

3. A coordination arrangement; for a remote control system and a telephone network using a common communication channel connecting a control office and a plurality of remote stations, said remote control system and said telephone network transmitting over said channel at selected times signals having similar characteristics, said control system being normally active and having apparatus at each location capable of transmitting control and indication functions between such locations; comprising in combination, (a) a manually actuated means at said office with connections to said remote control system for initiating the transmission of a telephone request control function when actuated to a first condition, (b) a first means at each station controlled by said control system for locking out the station indication transmitting apparatus when said telephone request control function is received, (c) a manually operated transfer means at said office also controlled by said control system for locking out the control system office transmitting apparatus and for connecting the office telephone apparatus to said channel after said request control function is transmitted, (d) a second means at each station controlled by said transfer means through said channel for completing the station telephone connections to said channel when the office transmitter is locked out, (e) an alarm indicator at a particular station operable to an active position in response to the occurrence of a selected alarm condition, (f) a relay means at said particular station controlled by said first means and by said alarm indicator and operable to an alarm position upon occurrence of said selected alarm condition only if the station transmitter is locked out, (1) said relay means having connections to said control system for initiating the transmission of an alarm warning signal when said relay means operates to its alarm position, (g) a registry means at said office controlled by said control system only during a period of remote control system lockout and responding to the reception of an alarm warning signal for displaying an alarm condition warning to direct a return of said transfer means to its normal position, (1) said transfer means in its normal position controlling said control system transmitter for transmitting a permissive signal to actuate said second means to its normal condition, (h) an auxiliary indication starting circuit including contacts controlled to a closed position by said first means in its lockout condition, said second means in its normal condition, said alarm indicator in its active position, and said relay means in its alarm position, (1) said circuit being connected to said remote control system for initiating the transmission of the alarm indication function when the circuit is closed, (i) said alarm indicator being controlled by the control system apparatus at said particular station for restoring the lockout condition and the telephone connections upon the completion of the alarm indication transmission, (j) said transfer means in its normal position and said manually actuated means in a second condition controlling said control system for initiating the interruption of the telephone connections and the removal of the lockout condition of the transmitter apparatus at all stations.

4. In combination with a normally active coded remote control system and a normally inactive telephone network using a common voice frequency communication circuit extending between a control office and a plurality of remote stations, said system and said network being adapted to use such communication circuit, (a) a first manually operable means at said office with connections to the remote control system apparatus for initiating the transmission of a first common control code to all stations when that means is actuated, (b) a second manually operable means at said office actuated for initiating the telephone network activation, (c) a transfer means at said office controlled by said second manually operable means when actuated and by said remote control system at the end of said first common code for locking out the office remote control system transmitter apparatus, to create a special condition on said communication circuit, and for connecting the office telephone apparatus to said communication channel.

(d) lockout means at each station controlled by said remote control system and responding to said first common control code for locking out the station remote control system transmitter apparatus and for preparing the station telephone apparatus connections, (e) monitor means at each station having connections to said communication circuit and controlled by the station lockout means for completing the station telephone connections to said communication circuit only when said first common code has been received and said special condition exists on said communication circuit, (f) a third manually operable means at said office having connections to the remote control system apparatus for actuating the transmission of a second common control code to all stations only if said second manually operable means has been returned to its nonactuated condition, (1) each station remote control system apparatus responding to said second common code for removing the lock out condition of the station transmitter apparatus.

5. In combination with a normally active coded remote control system and a normally inactive telephone network using a common voice frequency communication circuit extending between a control office and a plurality of remote stations, said system and said network being adapted to use such communication circuit, (a) a first manually operable means at said office with connections to the remote control system apparatus for initiating the transmission of a first common control code to all stations when that means is actuated, (b) a second manually operable means at said office actuated for initiating the telephone network activation, (c) a transfer means at said office controlled by said second manually operable means when actuated and by said remote control system at the end of said first common code for locking out the office remote control system transmitter apparatus, to create a special condition on said communication circuit, and for connecting the office telephone apparatus to said communication channel, (d) lockout means at each station controlled by said remote control system and responding to said first common control code for locking out the station remote control system transmitter apparatus and for preparing the station telephone apparatus connections, (e) monitor means at each station having connections to said communication circuit and controlled by the station lockout means for completing the station telephone connections to said communication circuit only when said first common code has been received and said special condition exists on said communication circuit, (f) a two position device at a particular station operable to its second position when a selected alarm condition occurs, (g) a registry means at said particular station controlled by said device and by the lockout means for registering said alarm condition when said device operates to its second position and a station apparatus lockout exists, (h) an auxiliary signal circuit at said particular station controlled by the lockout means and said registry means and having connections to said communication circuit for transmitting an alarm warning signal when an alarm condition is registered, (i) another registry means at said office having connections to said communication circuit for receiving and registering said alarm signal, (j) an auxiliary indication code starting circuit at said particular station controlled by the lockout means, said station registry means, the monitor means, and said device, (1) said starting circuit having connections to the station remote control apparatus for initiating an indication code to transmit said alarm condition when said device occupies its second position, the lockout means is in its lockout condition, the alarm condition has been registered and the alarm signal transmitted, and said special condition on said communication circuit has been temporarily removed by operation of said second manually operable means to its normal position, (k) a third manually operable means at said office having connections to the remote control system apparatus for actuating the transmission of a second common control code to all stations only if said second manually operable means has been returned to its nonactuated condition, (1) each station remote control system apparatus responding to said second common code for removing the lockout condition of the station transmitter apparatus.

6. In a joint remote control system and telephone network arrangement, said remote control system being normally connected to a communication channel extending between a control office and a plurality of remote station locations, said telephone network being normally inactive and disconnected from said channel, the combination comprising:

(a) changeover means controlled by said remote control system for locking out said remote control system and for connecting said telephone network to said channel at all locations, (b) a registry means at a particular station controlled by the station remote control apparatus for registering the occurrence of a selected alarm condition when said remote control system is locked out, (1) said registry means controlling the remote control apparatus for transmitting to said office a signal indicating the existence of said selected alarm condition, (c) a receiving means at said office having connections to said remote control system only when said telephone network is active for receiving the alarm signal and for indicating the existence of said selected alarm condition, (d) a manually controlled means at said office operable at selected times for actuating the office control system apparatus to transmit a control signal to temporarily inactivate said telephone network, (e) another receiving means at said particular station with connections to said channel for receiving said control signal, (f) a starting means at said particular station controlled by said registry means and by said other receiving means for initiating the transmission to said office of a specific indication of the existing alarm condition when said control signal is received and a selected alarm condition is registered, (g) said registry means being further controlled by the station remote control apparatus upon the completion of the specific indication transmission for actuating the return of said telephone network to the active condition.

7. In a communication arrangement including a coded remote control system and a telephone network having connections to a communication channel extending between a control office and a plurality of stations, said remote control system being normally active to transmit control and indication codes between said office and said stations, said telephone network being normally inactive and at times providing voice communication between said office and said stations after said control system is made non-operative, the combination comprising, (a) a registry means at a station controlled by the station remote control apparatus for registering the occurrence of a selected alarm condition when said remote control system is non-operative, (1) said registry means having other connections to said remote control system for actuating the transmission of an alarm signal to said office when said selected alarm condition is registered, (b) a receiving means at said office connected to said channel and controlled by the office telephone apparatus for receiving and recording said alarm signal only when said telephone network is active, (c) a control means at said office operable to a selected position for deactivating the office telephone apparatus and for actuating the transmission of a control signal to all stations, (d) a receiver means at each station with connections to said channel and to said station telephone apparatus for deactivating said telephone apparatus when said control signal is received, (e) a code start means jointly controlled by said registry means and said receiver means for initiating the transmission of an indication of said selected alarm condition when said control signal is received at that station, (f) said registry means being further controlled by said remote control apparatus when the transmission of the alarm indication is completed for interrupting said other connections to actuate the restoration of the telephone network to its active condition.

References Cited by the Examiner

UNITED STATES PATENTS

| | | | |
|---|---|---|---|
| 2,828,362 | 3/1958 | Darwin et al. | 179—2 |
| 2,957,046 | 10/1960 | Freeman et al. | 79—2 |

DAVID G. REDINBAUGH, *Primary Examiner.*

T. G. KEOUGH, J. T. STRATMAN, *Assistant Examiners.*